G. F. ALMY.
Hollow Augers.

No. 141,745. Patented August 12, 1873.

Witnesses
John A. Ellis
E. E. Ellis

Inventor
George F. Almy
Per
T. H. Alexander & Co.
Atty's

UNITED STATES PATENT OFFICE.

GEORGE F. ALMY, OF DELPHOS, ASSIGNOR TO HIMSELF AND H. M. CLARK, OF TOLEDO, OHIO.

IMPROVEMENT IN HOLLOW AUGERS.

Specification forming part of Letters Patent No. 141,745, dated August 12, 1873; application filed July 10, 1873.

*To all whom it may concern:*

Be it known that I, GEORGE F. ALMY, of Delphos, in the county of Van Wert and State of Ohio, have invented certain new and useful Improvements in Hollow Augers; and I do hereby declare that the following is a full, clear, and exact description thereof, reference being had to the accompanying drawings, and to the letters of reference marked thereon, which form a part of this specification.

The nature of my invention consists in the construction and arrangement of a hollow auger for making oval tenons, as will be hereinafter more fully set forth.

In order to enable others skilled in the art to which my invention appertains to make and use the same, I will now proceed to describe its construction and operation, referring to the annexed drawing, in which—

Figure 1:
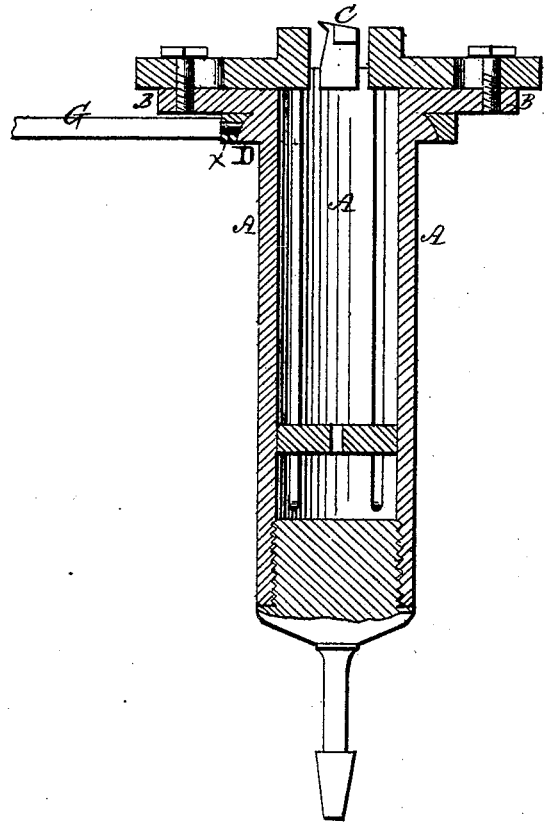
Figure 2:
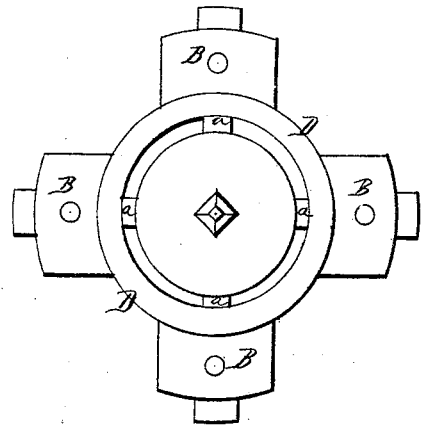

Figure 1 represents a longitudinal section, and Fig. 2 a bottom view.

One of the greatest difficulties in making light carriage and buggy wheels has been to get a tight spoke-and-felly joint, the reason being that, if a round tenon fits very tight in a round hole, the driving in will often split the felly. This is the case with the best straight-grained timber.

The object of my invention is to overcome this difficulty by constructing an auger that will make an oval tenon, so that the wedging-pressure of the tenon will be upon the ends instead of upon the sides of the wood, thereby preventing the swelling and splitting of the felly.

The auger proper is slotted into four sections, A A, in such a manner that each section is made to act as a spring. On the outer end of each of these spring-sections is attached a guide, B, with adjustable knife or cutter C, constructed in any of the known and usual ways to cut tenons. On the outside of each section A is a small lug or bearing, $a$, and upon the outside of these bearings is placed a suitably-shaped ring, D, which is made oval on its inner edge. For cutting an oval tenon a lever, G, is inserted in a hole, $x$, on the outside edge of the ring D, and this lever is allowed to rest on the spoke next to the one being operated upon. When the auger proper then is rotated and the ring held stationary by the lever just mentioned, the sections A A will necessarily conform to the oval shape of the inside of the ring D, as each section is made in the proper shape to press outward. The knives or cutters being attached to the spring-sections A A, they will necessarily cut an oval tenon.

This instrument is intended more particularly for hand-work, but is equally applicable to power machines.

Having thus fully described my invention, what I claim as new, and desire to secure by Letters Patent, is—

A hollow auger cut in a series of spring-sections A A, each section having a suitable knife or cutter, in combination with a ring, D, placed around the outside of the sections, and its inner edge made in oval form, all substantially as and for the purposes herein set forth.

In testimony that I claim the foregoing as my own I affix my signature in presence of two witnesses.

G. F. ALMY.

Witnesses:
 HENRY J. TRAME,
 L. S. S. RISLEY.